US008810801B2

(12) United States Patent
Tsuyuki

(10) Patent No.: US 8,810,801 B2
(45) Date of Patent: Aug. 19, 2014

(54) THREE-DIMENSIONAL MEASUREMENT APPARATUS, METHOD FOR CONTROLLING A THREE-DIMENSIONAL MEASUREMENT APPARATUS, AND STORAGE MEDIUM

(75) Inventor: Motomi Tsuyuki, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 13/459,750

(22) Filed: Apr. 30, 2012

(65) Prior Publication Data
US 2012/0287442 A1    Nov. 15, 2012

(30) Foreign Application Priority Data

May 10, 2011    (JP) .................................. 2011-105654

(51) Int. Cl.
*G01B 11/30* (2006.01)
*G01B 11/24* (2006.01)
*G06K 9/00* (2006.01)
*G01D 5/36* (2006.01)

(52) U.S. Cl.
USPC ......... 356/610; 356/603; 382/154; 250/237 G

(58) Field of Classification Search
CPC ............ G01B 11/2527; G01B 11/254; G01B 11/2513; G06T 7/0051; G06T 7/0057
USPC ................. 356/485–486, 496, 511, 601–614; 382/154; 250/237 G
See application file for complete search history.

(56) References Cited

U.S. PATENT DOCUMENTS

| | | | | |
|---|---|---|---|---|
| 6,510,244 | B2 * | 1/2003 | Proesmans et al. | 382/203 |
| 2007/0090189 | A1 * | 4/2007 | Suwa et al. | 235/454 |
| 2009/0040532 | A1 * | 2/2009 | Kawasaki et al. | 356/610 |
| 2009/0059241 | A1 * | 3/2009 | Lapa et al. | 356/603 |
| 2009/0190139 | A1 * | 7/2009 | Fisher et al. | 356/613 |
| 2011/0221891 | A1 * | 9/2011 | Sonoda | 348/135 |
| 2012/0154540 | A1 | 6/2012 | Tsuyuki | |

FOREIGN PATENT DOCUMENTS

JP    2007192608 A * 8/2007

* cited by examiner

*Primary Examiner* — Kara E. Geisel
*Assistant Examiner* — Willie Merrell, II
(74) *Attorney, Agent, or Firm* — Fitzpatrick, Cella, Harper & Scinto

(57) ABSTRACT

A three-dimensional measurement apparatus comprises a detection unit configured to detect a plurality of intersection positions between first pattern light in which a bright part and a dark part are alternately arranged and second pattern light in which a phase of the first pattern light is shifted, by using tone values of a first image obtained by capturing a target object onto which the first pattern light is projected and tone values of a second image obtained by capturing the target object onto which the second pattern light is projected; and a measurement unit configured to calculate a third position based on a first intersection position included in the plurality of intersection positions and a second intersection position that is adjacent to the first intersection position and measure a three-dimensional position of the target object based on an interval between the third positions.

9 Claims, 6 Drawing Sheets

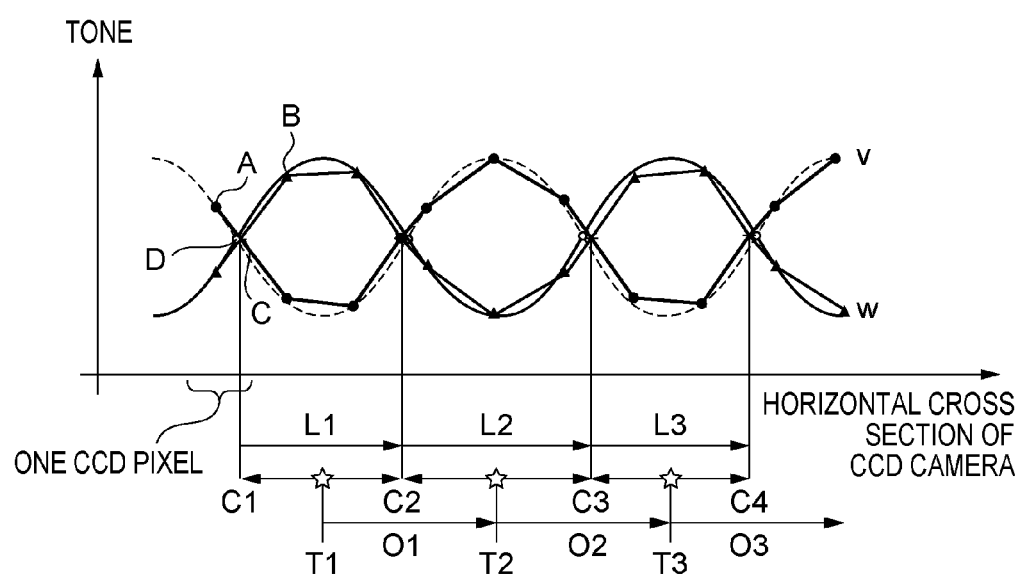
F I G. 3

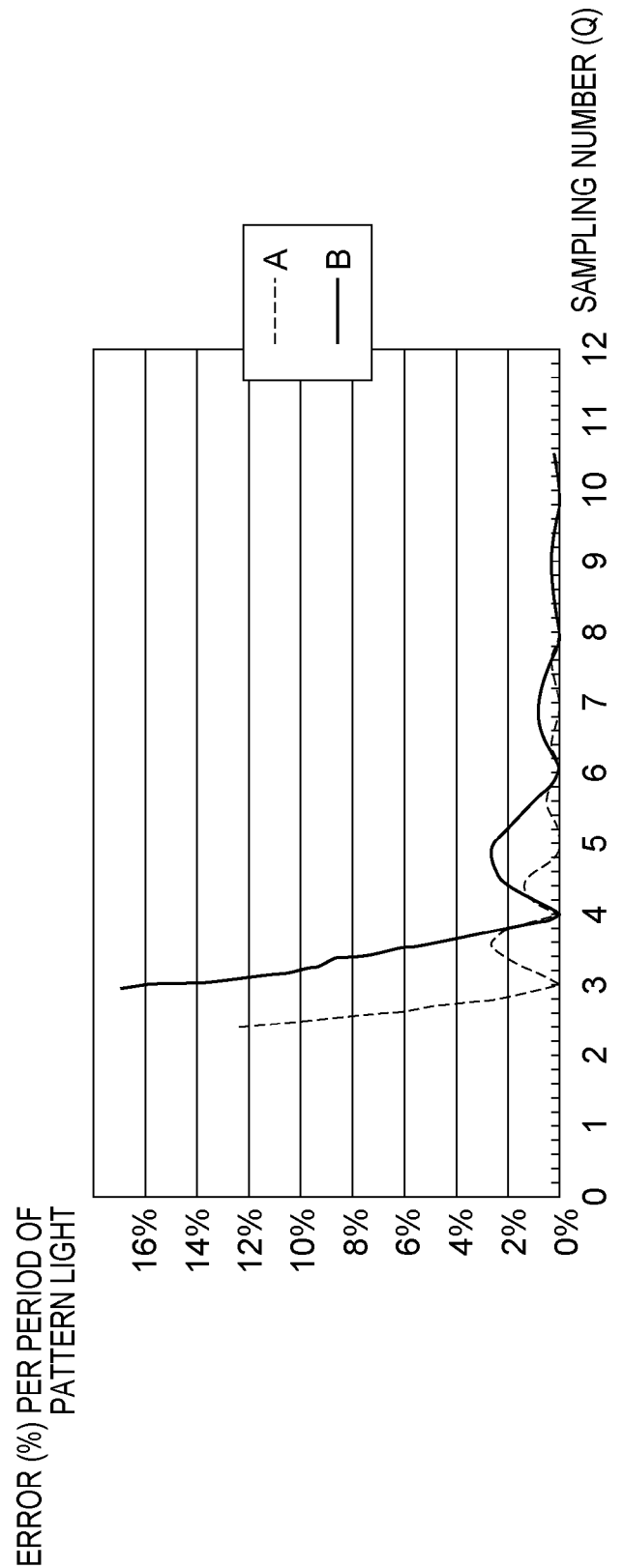

THREE-DIMENSIONAL MEASUREMENT APPARATUS, METHOD FOR CONTROLLING A THREE-DIMENSIONAL MEASUREMENT APPARATUS, AND STORAGE MEDIUM

BACKGROUND OF THE INVENTION

1. Field of the Invention

The present invention relates to a communication apparatus that selects a network for connection from among a plurality of networks, a method for controlling such a communication apparatus, and a storage medium.

2. Description of the Related Art

The present invention relates to a three-dimensional measurement apparatus, a method for controlling a three-dimensional measurement apparatus and a program, and more particularly to a three-dimensional measurement apparatus using a spatial coding technique that generates spatial modulation by projecting pattern light in which a bright part and a dark part are arranged at a given interval, a method for controlling such a three-dimensional measurement apparatus and a program.

As three-dimensional measurement, a measurement method is well known in which a projection apparatus and a capturing apparatus are disposed in a known relationship, an object onto which pattern light is projected from the projection apparatus is captured, and the distance to the object is determined from the relationship between the projection apparatus and the capturing apparatus using triangulation.

Japanese Patent Laid-Open No. 2007-192608 discloses a method for performing three-dimensional measurement by projecting first pattern light in which a bright part and a dark part are alternately arranged at a given interval and second pattern light in which the phase of the first pattern light is shifted so as to obtain tone distributions of respective captured images and calculating the position on the image sensor of an intersection point between the first pattern light and the second pattern light.

Distance measurement is based on the calculation of positions at which intersections calculated from the first pattern light and the second pattern light are located, but what is more important than the absolute values of the intersection points between the first pattern light and the second pattern light is accurate determination of intersection intervals therebetween.

The reason is as follows. The absolute values of the intersection points are necessary to calculate the absolute position of an object, but the main purpose of three-dimensional measurement is to measure the shape of an object, so that in this case, it is sufficient if relative positions of intersection points can be accurately determined. Calculation of the absolute position of an object can be achieved by preparing known absolute position indices and performing calibration for measuring the relative relationship of the object with the indices.

With conventional intersection point detection techniques, intersection points are determined by sampling tone distributions on the image sensor of first pattern light and second pattern light with capture pixels and performing straight-line approximation on sampling points of the respective pattern lights. In the case of sampling one period of the pattern light projected onto the measurement target object with a relatively small number of image sensor pixels, if a conventional method is used to determine intersection points, sampling errors due to straight-line approximation are included in the intersection points. Accordingly, if intersection intervals are calculated using the intersection points, errors will occur in the intersection intervals. The occurrence of such errors becomes apparent particularly when one period of the pattern light is sampled with an approximately odd number of image sensor pixels. The intersection point errors as well as the intersection interval errors can be reduced if one period of the pattern light is sampled with a higher number of image sensor pixels, but it requires a high-resolution image sensor so problems arise in that the size and cost of the apparatus increase. Meanwhile, there are cases where the luminance value of either the first pattern light or the second pattern light becomes high overall due to the influence of ambient light or the like. In this case, even if a high-resolution image sensor is used, shifts occur in the intersection points between the first pattern light and the second pattern light, causing errors in intersection point calculation.

SUMMARY OF THE INVENTION

In view of the problems described above, the present invention provides a technique for improving the accuracy of three-dimensional measurement by reducing errors in the intersection intervals.

According to one aspect of the present invention, there is provided a three-dimensional measurement apparatus comprising: a detection unit configured to detect a plurality of intersection positions between first pattern light in which a bright part and a dark part are alternately arranged and second pattern light in which a phase of the first pattern light is shifted, by using tone values of a first image obtained by capturing a target object onto which the first pattern light is projected and tone values of a second image obtained by capturing the target object onto which the second pattern light is projected; and a measurement unit configured to calculate a third position based on a first intersection position included in the plurality of intersection positions detected by the detection unit and a second intersection position that is adjacent to the first intersection position and measure a three-dimensional position of the target object based on an interval between the third positions.

According to one aspect of the present invention, there is provided a method for controlling a three-dimensional measurement apparatus comprising: detecting a plurality of intersection positions between first pattern light in which a bright part and a dark part are alternately arranged and second pattern light in which a phase of the first pattern light is shifted, by using tone values of a first image obtained by capturing a target object onto which the first pattern light is projected and tone values of a second image obtained by capturing the target object onto which the second pattern light is projected; and calculating a third position based on a first intersection position included in the plurality of intersection positions detected by the detection unit and a second intersection position that is adjacent to the first intersection position and measuring a three-dimensional position of the target object based on an interval between the third positions.

Further features of the present invention will be apparent from the following description of exemplary embodiments with reference to the attached drawings.

BRIEF DESCRIPTION OF THE DRAWINGS

FIG. 3 is a diagram showing tone values obtained from captured image data when the sampling number is set to 5.

FIG. 8 is a diagram showing the amount of error of intersection intervals when one period of pattern light on the surface of a measurement target object is sampled with CCD camera pixels.

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Figure 1:
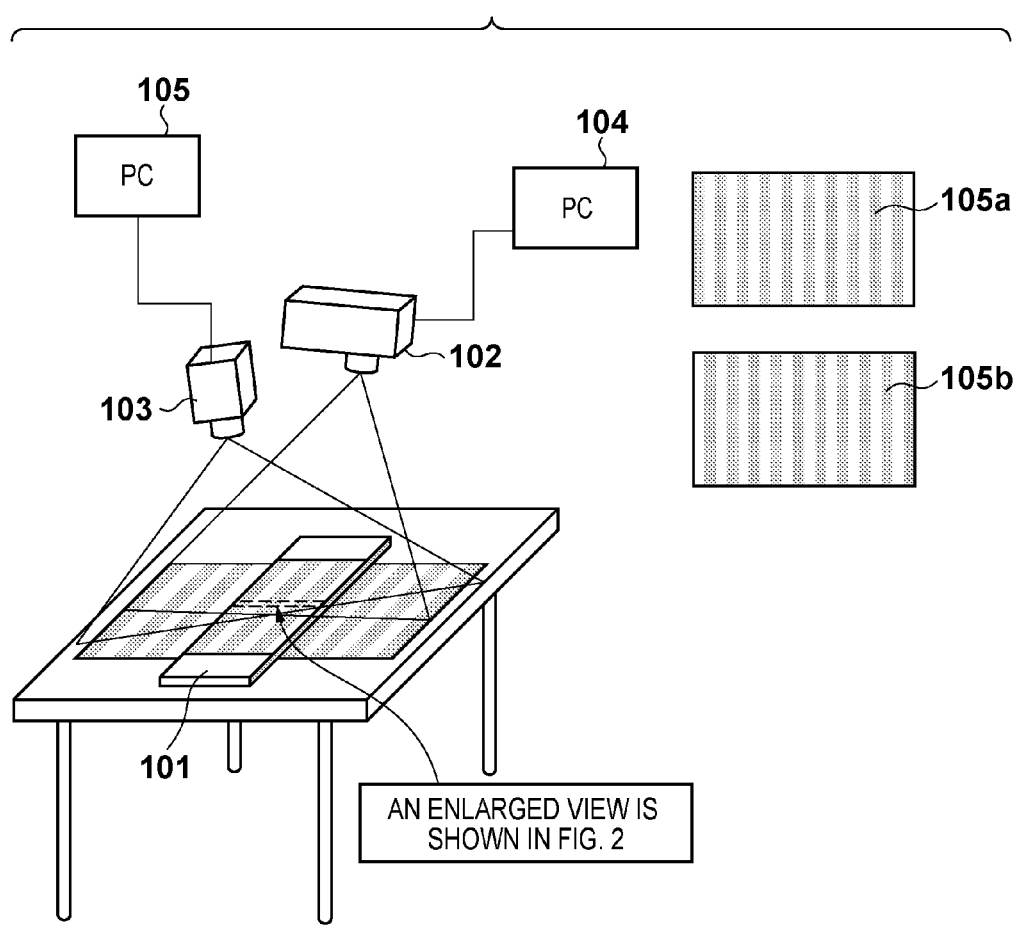
FIG. 1 is a diagram showing the basic configuration of a three-dimensional measurement apparatus according to the present invention.

The basic configuration of a three-dimensional measurement apparatus according to the present invention will be described with reference to FIG. 1. The three-dimensional measurement apparatus includes a projection unit 102, an image capturing unit 103, a computer 104 and a computer 105, and measures the three-dimensional position of a measurement target object 101. The projection unit 102 is a projector that projects pattern light onto the measurement target object 101. The image capturing unit 103 can be, for example, a CCD camera. The computer 104 inputs images to the projection unit 102. The computer 105 obtains values of captured image data, or in other words, tone values, and calculates the three-dimensional position of the measurement target object 101.

Examples of the pattern light used in the present invention include first pattern light 105a in which bright parts and dark parts are alternately arranged and second pattern light 105b in which the phase of the first pattern light is shifted. However, the first pattern light and the second pattern light may have configurations different from those shown in FIG. 1.

A method for calculating the position of the measurement target object 101 will be described below. The first pattern light 105a and the second pattern light 105b are transmitted from the computer 104 to the projection unit 102 in the form of signals. The pattern light 105a and the pattern light 105b are projected onto the measurement target object 101 via the projection unit 102, and the luminance distribution on the measurement target object 101 of the projected pattern light is captured by the image capturing unit 103, and then inputted into the computer 105 as digital image data.

Hereinafter, the values of respective image data (first image data and second image data) of the first pattern light 105a and the second pattern light 105b will be referred to as "tone values". Of the image, a cross section of certain CCD pixels is taken, and in the cross section, the tone values of the first pattern light 105a and the second pattern light 105b are connected with lines, as will be described later with reference to FIG. 3, the lines connecting the tone values of the first pattern light 105a and the second pattern light 105b intersect.

Figure 2:
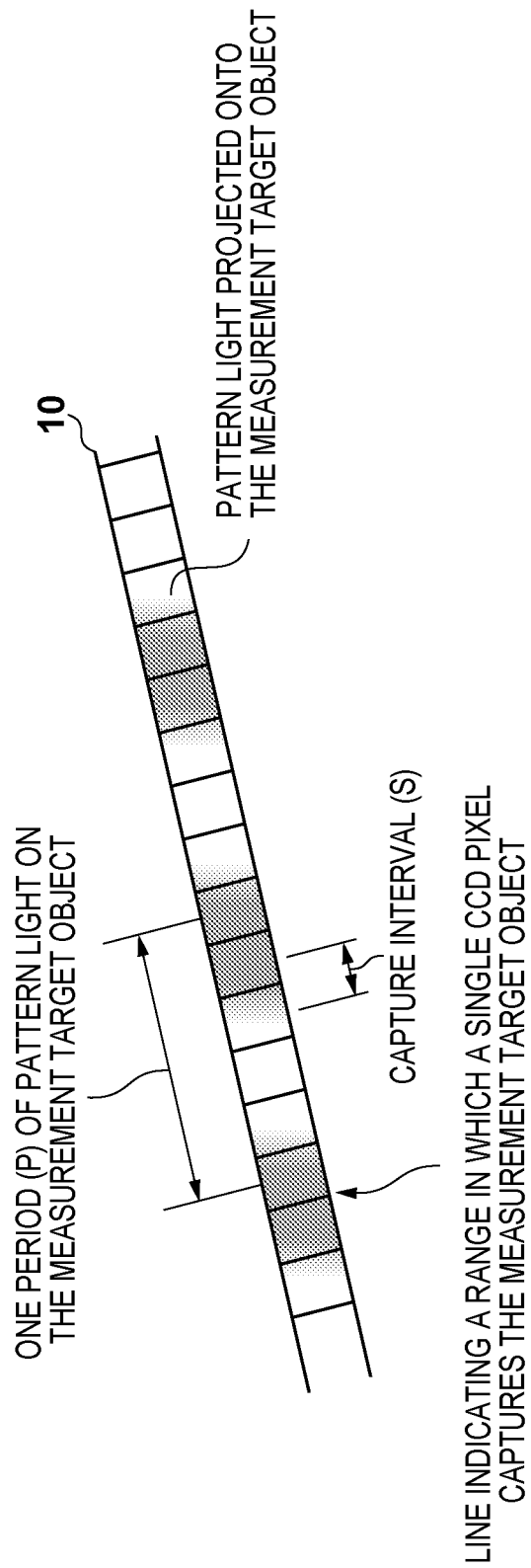
FIG. 2 is a diagram showing the relationship between pattern light on the surface of a measurement target object and the pixels of a CCD camera.

Next, the relationship between the intensity distribution of the pattern light projected onto the measurement target object 101 shown in FIG. 1 and the tone distribution after image capturing that has been sampling-controlled by the image capturing unit 103 will be described with reference to FIG. 2. A solid line 10 shown in FIG. 2 indicates a range on the measurement target object 101 corresponding to individual pixels of the image capturing unit 103 (CCD camera), and the capture interval is defined as S. One period of the pattern light (a pair of a bright part and a dark part) on the measurement target object 101 is defined as P, and the number of pixels corresponding to a sampling number Q is defined as Q (positive real number) that satisfies $P=Q \times S$ ($Q>0$). In the first embodiment, the projection unit 102 and the image capturing unit 103 are configured such that Q=5 (odd number pixel) is satisfied.

A method for detecting a boundary between the first pattern light and the second pattern light by obtaining tone values from image data corresponding to the first pattern light and the second pattern light will be described below with reference to FIG. 3.

In FIG. 3, the horizontal axis represents the direction of CCD pixels, and the vertical axis represents the tone values obtained from the image data. A curve V and a curve W respectively indicate the intensity distributions on the image sensor of the first pattern light and the second pattern light projected onto the measurement target object 101. A point sequence D is a sequence of intersection points of the curves V and W indicating intensity distributions. A point sequence A and a point sequence B are point sequences in the tone distribution obtained by sampling the curves V and W indicating intensity distributions with capture pixels. A point sequence C is composed of intersection points between lines obtained by connecting the point sequence A with a straight line and lines obtained by connecting the point sequence B with a straight line. A sequence of points L1, L2 . . . is a number sequence indicating the distance between two adjacent points of the point sequence C, and also values of intersection intervals calculated by a conventional method.

Figure 4:
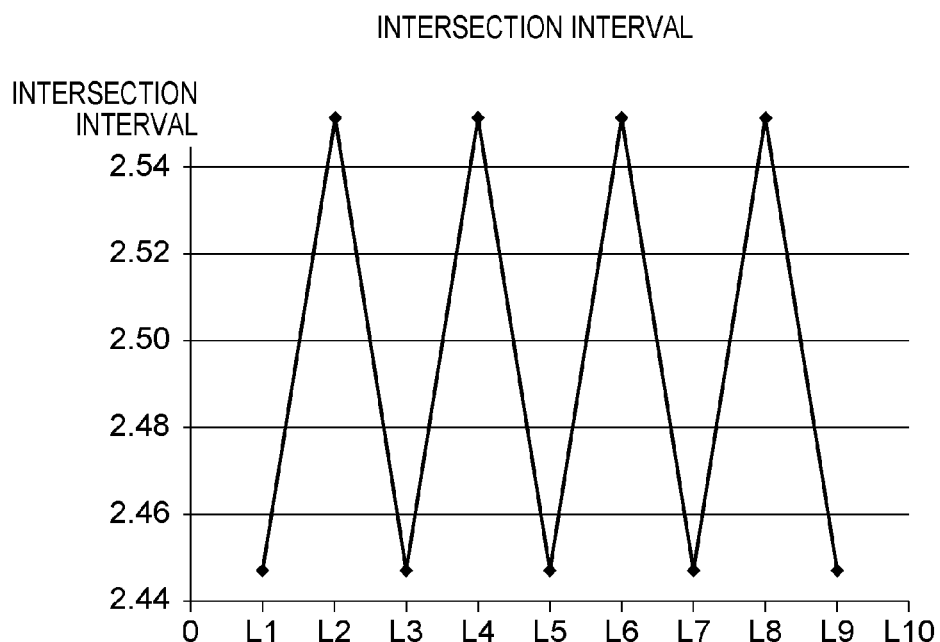
FIG. 4 is a diagram showing intersection intervals calculated from a point sequence C.

FIG. 4 shows the relationship between intersection intervals L and the value of the intersection intervals. Since one period of the pattern light projected onto the measurement target object 101 is assumed to be equal to five image sensor pixels, the true value of the intersection intervals is 2.5, which is half of the pixel number, and it can be seen from FIG. 4 that the number sequence L1, L2 . . . are distributed symmetrically around the true value (2.5).

A sequence of points T1, T2 . . . shown in FIG. 3 is obtained through calculating by regarding two adjacent points of the point sequence C as a first intersection point and a second intersection point and the midpoint therebetween as a third point, and indicates the third positions according to the present invention. A sequence of points O1, O2 . . . is a number sequence indicating the distance between two adjacent points of the point sequence T, and values of intersection intervals obtained as a result of application of the present invention.

Figure 5:
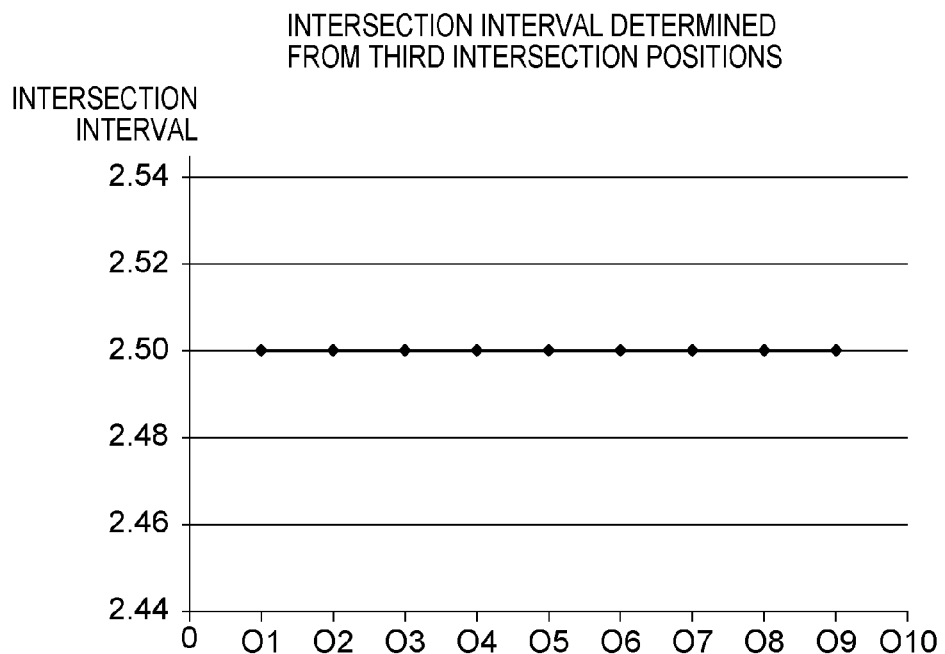
FIG. 5 is a diagram showing intersection intervals calculated from a point sequence T.

FIG. 5 shows the relationship between intersection interval O and the value of the intersection interval. Since one period of the pattern light is sampled with five image sensor pixels (odd number pixel), the true value of the intersection intervals is 2.5, which is half of the pixel number, and the obtained number sequence O is also distributed evenly at 2.5.

As described above, determining intersection intervals by calculating the third intersection positions can bring the intersection intervals close to the true value. When the intersection intervals are accurately determined, the amount of shift from the accurate intersection positions can be easily corrected based on known indices. For example, three-dimensional measurement using a spatial coding technique can be performed with high accuracy. The technique used in the present embodiment is also effective when the luminance value of either the first pattern light or the second pattern light is high overall due to the influence of ambient light and the like and an error has occurred during intersection point calculation. Accordingly, the technique of the present embodiment may be used when the three-dimensional measurement apparatus of the present embodiment is provided with a detection unit for detecting ambient light, and the influence of ambient light is a predetermined value or higher.

Second Embodiment

Figure 6:
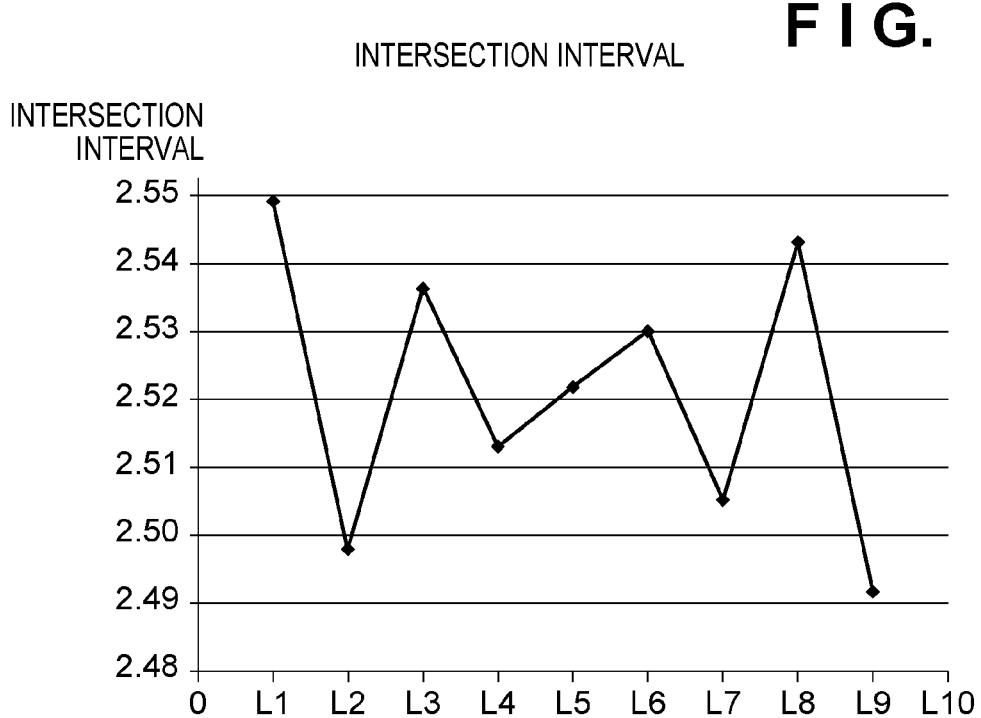
FIG. 6 is a diagram showing intersection intervals calculated by a conventional method when the sampling number is set to 5.04.

FIG. 6 shows the values of intersection intervals obtained by sampling one period of the pattern light with 5.04 image sensor pixels (approximately odd number) and performing calculation using a conventional method. Since a configuration is used in which one period of the pattern light projected onto the measurement target object 101 is captured with 5.04 image sensor pixels, the true value of the intersection intervals is 2.52, which is half of the pixel number. In FIG. 6, it can be seen that the intersection intervals are distributed symmetrically around the true value 2.52.

Figure 7:
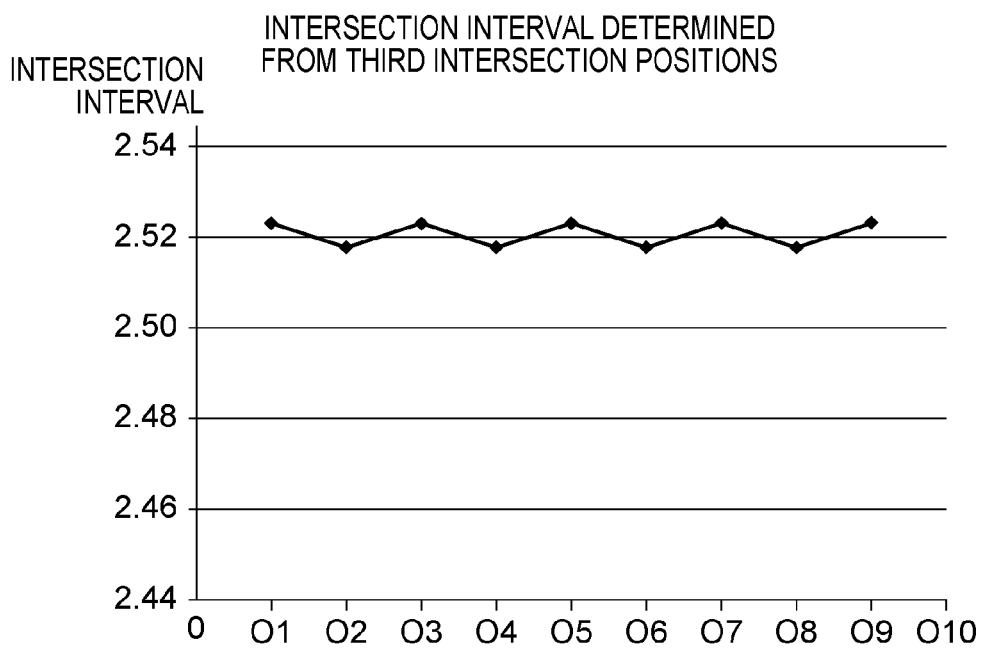
FIG. 7 is a diagram showing intersection intervals calculated by a method according to the present invention when the sampling number is set to 5.04.

FIG. 7 shows the values of intersection intervals obtained by determining a third intersection position of the present invention as the midpoint between a first intersection position and a second intersection position and performing calculation using the third intersection position. In FIG. 7, the values are distributed symmetrically around 2.52, which is the true value of the intersection intervals, but the method of the present invention can reduce the width of the distribution by half or more and bring it closer to the true value as compared to the errors in the intersection intervals calculated with the conventional method shown in FIG. 6. Accordingly, the present invention enables more accurate three-dimensional measurement as compared to the conventional method.

FIG. 8 shows the result of calculation of the amount of error of the intersection intervals in the case where one period of the pattern light projected onto the measurement target object 101 is sampled with Q image sensor pixels. In FIG. 8, the horizontal axis represents the sampling number Q, and the vertical axis represents the amount of error per period of the pattern light (the unit is %).

The amount of error in the intersection intervals determined by the conventional method is indicated by a line B, and the amount of error in the intersection intervals determined by the method of the present invention is indicated by a line A.

The amount of error in the intersection intervals determined by the method of the present invention is overall lower than the amount of error in the intersection intervals determined by the conventional method, and values close to the true value can be obtained when the sampling number Q is an approximately even or odd number.

Particularly when the sampling number Q is an approximately odd number, the amount of error can be reduced by half or more as compared to the amount of error of the intersection intervals determined by the conventional method. In the case where one period of the pattern light is sampled and captured with Q image sensor pixels, the intersection interval in particular approaches the true value and the error approaches 0, where Q satisfies the following formula:

$$N-0.2 \leq Q \leq N+0.2 \text{ ($N$ is a natural number)} \quad (1).$$

If the sampling number Q is greater than 10, it means that one period in an image projected by the projector is captured with a higher number of CCD pixels, and thus the error of each intersection interval obtained by the conventional method becomes smaller as the value of Q is increased.

If, on the other hand, the sampling number Q is 10 or less, or in other words, if Q does not satisfy the formula (1), the error of the intersection interval becomes large, so that it will be difficult to perform correction so as to bring the obtained value to the true value, reducing the accuracy of the position obtained from the three-dimensional measurement. For this reason, when Q in the formula (1) is 10 or less, the present invention is effective in performing more accurate three-dimensional measurement.

As described above, by determining a third intersection point from a first intersection point between the first pattern light and the second pattern light and a second intersection point that is adjacent to the first intersection point, and determining intersection intervals from the plurality of determined third intersection positions, the intersection intervals can be brought closer to the true value. Particularly when the sampling number is an approximately odd number, the error of the intersection intervals can be reduced significantly and more accurate three-dimensional measurement can be performed, as compared to the conventional technique for determining intersection points.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-105654 filed on May 10, 2011, which is hereby incorporated by reference herein in its entirety.

What is claimed is:
1. An apparatus comprising:
 a detection unit configured to detect a plurality of intersection positions between first pattern light in which a bright part and a dark part are alternately arranged and second pattern light in which a phase of the first pattern light is shifted, using tone values of a first image obtained by capturing a target object onto which the first pattern light is projected and tone values of a second image obtained by capturing the target object onto which the second pattern light is projected; and
 a measurement unit configured to calculate a third position based on a first intersection position included in the plurality of intersection positions detected by the detection unit and a second intersection position that is adja- cent to the first intersection position and measure a three-dimensional position of the target object based on the third position.

2. The apparatus according to claim 1,
wherein the measurement unit measures the three-dimensional position of the target object using a spatial coding technique based on the third position.

3. The apparatus according to claim 1,
wherein the measurement unit calculates the third position as a midpoint between the first intersection position and the second intersection position.

4. The apparatus according to claim 1, further comprising:
a projection unit configured to project the first pattern light or the second pattern light onto the target object; and
an image capturing unit configured to capture the target object onto which the first pattern light or the second pattern light is projected, as the first image or the second image.

5. The apparatus according to claim 4, wherein, when a pair of the bright part and the dark part of the pattern light is assumed to be one period, the image capturing unit performs capturing by arranging the projection unit and the image capturing unit such that the one period of the projected pattern light is captured with Q pixels (Q is a real number) of an image sensor of the image capturing unit and $N-0.2 \leq Q \leq N+0.2$ (N is a natural number) is satisfied.

6. The apparatus according to claim 5,
wherein N is an odd number.

7. The apparatus according to claim 1,
wherein the second pattern light is pattern light in which the bright part and the dark part of the first pattern light are reversed.

8. A method for controlling an apparatus comprising:
detecting a plurality of intersection positions between first pattern light in which a bright part and a dark part are alternately arranged and second pattern light in which a phase of the first pattern light is shifted, using tone values of a first image obtained by capturing a target object onto which the first pattern light is projected and tone values of a second image obtained by capturing the target object onto which the second pattern light is projected; and
calculating a third position based on a first intersection position included in the plurality of intersection positions detected by the detection unit and a second intersection position that is adjacent to the first intersection position and measuring a three-dimensional position of the target object based on the third position.

9. A non-transitory computer-readable storage medium storing a computer program for causing a computer to execute the steps of the method for controlling an apparatus, the steps of the method comprising:
detecting a plurality of intersection positions between first pattern light in which a bright part and a dark part are alternately arranged and second pattern light in which a phase of the first pattern light is shifted, using tone values of a first image obtained by capturing a target object onto which the first pattern light is projected and tone values of a second image obtained by capturing the target object onto which the second pattern light is projected; and
calculating a third position based on a first intersection position included in the plurality of intersection positions detected by the detection unit and a second intersection position that is adjacent to the first intersection position and measuring a three-dimensional position of the target object based on the third position.

* * * * *